US008831109B2

United States Patent
DeLuca

(10) Patent No.: US 8,831,109 B2
(45) Date of Patent: Sep. 9, 2014

(54) AGILE DECODER

(75) Inventor: Michael Anthony DeLuca, Burlington, MA (US)

(73) Assignee: GVBB Holdings S.A.R.L., Luxembourg (LU)

( * ) Notice: Subject to any disclaimer, the term of this patent is extended or adjusted under 35 U.S.C. 154(b) by 1376 days.

(21) Appl. No.: 11/883,984

(22) PCT Filed: Feb. 1, 2006

(86) PCT No.: PCT/US2006/003520
§ 371 (c)(1),
(2), (4) Date: Aug. 8, 2007

(87) PCT Pub. No.: WO2006/088644
PCT Pub. Date: Aug. 24, 2006

(65) Prior Publication Data
US 2009/0123081 A1    May 14, 2009

Related U.S. Application Data

(60) Provisional application No. 60/653,538, filed on Feb. 16, 2005.

(51) Int. Cl.
*H04N 7/26* (2006.01)
*H04N 7/18* (2006.01)
(Continued)

(52) U.S. Cl.
USPC ............ 375/240.25; 375/240.02; 375/240.16; 386/125; 382/232; 382/234; 348/441; 341/51; 341/52; 345/589

(58) Field of Classification Search
USPC ........... 375/240.25, 240.16, 240.02; 382/232, 382/234; 341/52, 51; 345/589; 386/125; 348/441

See application file for complete search history.

(56) References Cited

U.S. PATENT DOCUMENTS

| 4,570,217 A | 2/1986 | Allen et al. |
| 6,246,720 B1 * | 6/2001 | Kutner et al. ............ 375/240.25 |

(Continued)

FOREIGN PATENT DOCUMENTS

| CN | 1630335 | 6/2005 |
| JP | 2002354475 A | 12/2002 |

(Continued)

OTHER PUBLICATIONS

Brett, M. ; Gerstenberg, B. ; Herberg, C. ; Shavit, G. ; Liondas, H.; "Video processing for single-chip DVB decoder"; Consumer Electronics, IEEE Transactions on vol. 47, Issue: 3; Digital Object Identifier: 10.1109/30.964125 Publication Year: Jun. 2001, pp. 385-393.*

(Continued)

*Primary Examiner* — Andrew L Nalven
*Assistant Examiner* — Courtney Fields
(74) *Attorney, Agent, or Firm* — Arent Fox LLP

(57) ABSTRACT

A decoder arrangement (10) includes a processor (12) programmed to decode multiple streams (11$_1$-11$n$), including multiple streams of different formats. In terms of functionality, the decoder arrangement includes a routing stage (13) routes each streams to different decoder stages (14$_1$-14$n$), each capable of decoding a stream of a particular format to yield an uncompressed stream at its output. Each of plurality of buffer stages (16$_1$-16$n$) stores a successive frame of an uncompressed stream output by an associated decoder stage. An output stage scales and the frames stored by the buffer stages to a common size for input to a display device (22).

14 Claims, 1 Drawing Sheet

(51) Int. Cl.

| | | |
|---|---|---|
| *H03M 5/00* | (2006.01) | |
| *H03M 7/34* | (2006.01) | |
| *G06K 9/36* | (2006.01) | |
| *G06K 9/46* | (2006.01) | |
| *G09G 5/02* | (2006.01) | |
| *H04N 7/12* | (2006.01) | |
| *H04N 7/14* | (2006.01) | |
| *H04L 12/26* | (2006.01) | |
| *G09G 5/00* | (2006.01) | |
| *H04N 5/907* | (2006.01) | |

(56) References Cited

U.S. PATENT DOCUMENTS

| | | | |
|---|---|---|---|
| 6,879,266 B1* | 4/2005 | Dye et al. | 341/51 |
| 7,400,359 B1* | 7/2008 | Adams | 348/441 |
| 2002/0136540 A1* | 9/2002 | Adams et al. | 386/125 |
| 2005/0012759 A1 | 1/2005 | Valmiki et al. | |
| 2005/0074173 A1 | 4/2005 | Lee et al. | |
| 2006/0114136 A1* | 6/2006 | Chu et al. | 341/52 |
| 2006/0176312 A1* | 8/2006 | Kuno | 345/589 |
| 2009/0196345 A1* | 8/2009 | Nair et al. | 375/240.02 |

FOREIGN PATENT DOCUMENTS

| | | | |
|---|---|---|---|
| JP | 2003152546 A | | 5/2003 |
| JP | 2003189299 A | * | 7/2003 |
| WO | 2004051982 A | | 6/2004 |

OTHER PUBLICATIONS

Zhenyu Tu ; Li, T.J. ; Blum, R.S.; "On Scalar Quantizer Design with Decoder Side Information"; Information Sciences and Systems, 2006 40th Annual Conference on Digital Object Identifier: 10.1109/CISS.2006.286467; Publication Year: Feb. 2006; pp. 224-229.*

Akramullah, S.M. et al: "Performance of Software-Based MPEG-2 Video Encoder on Parallel and Distributed Systems", IEEE Transactions on Circuits and Systems for Video Technology, IEEE Service Center, Piscataway, NJ, USA, vol. 7, No. 4, Aug. 1997, pp. 687-695, XP000694621.

Arakawa, H. et al.: "Software architecture for flexible and extensible image decoding", Signal Processing, Image Communication, Elsevier Science Publishers, Amsterday, NL, vol. 10, No. 1-3, Jul. 1997, pp. 235-248, XP004082709.

Bahl, P et al.: "Software-only Compression, Rendering, and Playback of Digital Video" Digital Technical Journal, vol. 7, No. 4, 1995, XP002380237.

Huttunen, A. et al: "Software decoding of HDTV", Consumer Electronics, 1999. ICCE, Int'l. Conference in Los Angeles, CA, USA, Piscataway, NJ, USA, IEEE, Jun. 22, 1999, pp. 52-53, XP010346666.

Mplayer Team: "Mplayer—The Movie Player", http:/www.mplayer.hq.hu, Feb. 7, 2005, XP002380238.

International Search Report, dated May 29, 2006.

Notice of Grounds for Rejection in Korean Application No. 2007-7018642 mailed Jul. 16, 2012.

P. Bahl et al., "Software-Only Compression, Rendering and Playback of Digital Video", Digital Technical Journal, vol. 7, No. 4, 1995, pp. 52-74.

Notice of Final Rejection for Korean patent application No. 2007-7018642 issued by the Korean Intellectual Property Office on Nov. 28, 2012 (6 pages).

Translation of Notice of Reasons for Rejection for Japanese patent application No. 2007-555132 issued by the Japanese Patent Office on Apr. 7, 2011.

Translation of Notice of Reasons for Rejection for Japanese patent application No. 2007-555132 issued by the Japanese Patent Office on Dec. 11, 2012.

Written Opinion of the International Searching Authority for International application No. PCT/US2006/003520 issued by European Patent office.

Eiji Iwata, Kunle Olukotun, "Exploiting Coarse-Grain Parallelism in the MPEG-2 Algorighm," Stanford University Computer Systems Lab Technical Report, United States, Sep. 1998 issue, pp. 1-13, CSL-TR-98-771, http://www.hydra.stanford.edu/publications/MPEG.pdf.

Japan Patent Application No. 2007-555132, Reasons for Rejection dated May 7, 2013 (English Translation only).

Japan Patent Application No. 2007-555132, Appeal Decision dated Jan. 14, 2014 (English Translation only).

China Patent Application No. CN200680004733.6, Third Office Action dated Jan. 20, 2011 (English Translation only).

China Patent Application No. CN200680004733.6, Fourth Office Action dated Feb. 14, 2012 (English Translation only).

Canadian Patent Application No. CA2597536, Office Action dated Oct. 23, 2012.

* cited by examiner

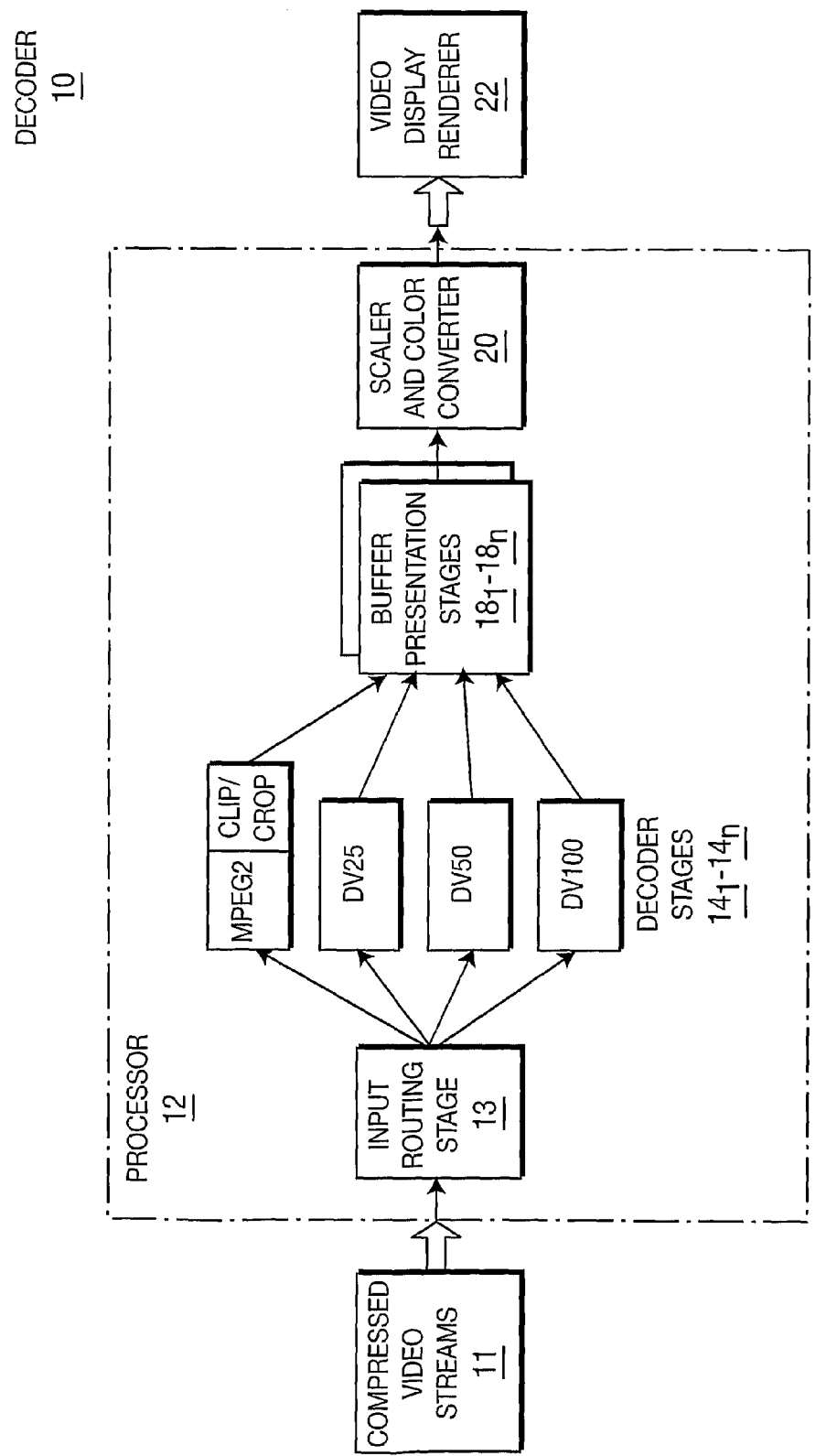

AGILE DECODER

CROSS-REFERENCE TO RELATED APPLICATIONS

This application claims priority under 35 U.S.C. 119(e) to U.S. Provisional Patent Application Ser. No. 60/653,538, filed Feb. 16, 2005, the teachings of which are incorporated herein.

This application claims the benefit, under 35 U.S.C. §365 of International Application PCT/US2006/003520, filed Feb. 1, 2006 published in accordance with PCT Article 21(2) on Aug. 24, 2006 in English.

TECHNICAL FIELD

This invention relates to a decoder for decoding compressed streams.

BACKGROUND ART

Traditionally, video decoders have been hardware-based. In other words, typical video decoders take the form of discrete, stand-alone devices dedicated for this purpose. With hardware decoder implementations, decoding streams of different formats usually requires a different chipset for each stream type and relatively lengthy firmware downloads. Multiple chipsets can prove to be very costly and making firmware changes in real-time becomes impractical.

Thus a need exists for a decoder arrangement that overcomes the disadvantages of the prior art.

BRIEF SUMMARY OF THE INVENTION

Briefly, in accordance with a preferred embodiment of the present principles, there is provided a decoder for decoding at least first and second compressed streams. The decoder comprises first and second decoder stages, each capable of decoding a separate one of the at least first and second streams to yield first and second uncompressed streams, respectively. A routing stage routes the at least first and second streams to the at least first and second decoder stages, respectively. At least first and second buffer stages each store a separate one of the first and second uncompressed streams output by the first and second decoder stages. An output stage combines the uncompressed streams stored by the at least first and second buffer stages.

In practice, the decoder arrangement of the present principles comprises a processor programmed with software to perform the function of each of the decoder stages. Software decoders allow for a high degree of customization and afford greater flexibility and control over the decoding process. Source video material used in non-linear editors (NLEs) can come from different sources and can undergo compression in different formats, such as MPEG2, DV, JPG2K for example. The material also can have different presentation sizes, for instance, standard definition NTSC vs. high-definition 1080i. The decoder arrangement of the present principles can decode video streams regardless of their native compression format or image size by making use of decoder stages capable of decoding different formats. The decoder arrangement of the present principles can decompress frames of different formats and compose the uncompressed frames onto a common "canvas." Further, with the availability of relatively inexpensive multiprocessor systems, the decoder arrangement of the present principles can execute on multiple parallel threads so that processing throughput can scale with the number and speed the available processors.

BRIEF DESCRIPTION OF THE DRAWINGS

FIG. 1 depicts a block schematic diagram of a decoder arrangement in accordance with a preferred embodiment of the present principles.

DETAILED DESCRIPTION

FIG. 1 depicts a block schematic drawing of a decoder arrangement 10 in accordance with a preferred embodiment of the present principles for uncompressing a plurality of compressed video streams $11_1$-$11_n$, where n is an integer greater than zero. In practice, one or more of the video streams $11_1$-$11_n$ can have a different format from the others. For example, one of the streams can take the form of an MPEG 2 stream, while another stream could take the form of a DV25 or DV50 stream. The particular format of each stream remains unimportant, as long as the particular format of the stream is known a priori.

In practice the decoder 10 of the present principles comprises a programmed processor 12, such as a microprocessor, microcomputer or the like, which operates in stages as described in greater detail below. When programmed to operate as a software decoder, the processor 12 will possess an input routing stage 13 that routes the compressed video streams $11_1$-$11_n$ to an appropriate one of a plurality of decoder stages $14_1$-$14_n$ depending of the compression format of the incoming stream. Each of decoder stages $14_1$-$14_n$ operates to de-compress an incoming of a particular format. Typical compression formats include MPEG 2, DV25, and DV50 for standard definition (SD) video, and MPEG 2, H.264-MPE4 AVC and D 100 for high definition video. Thus, depending on the composition of the compressed video streams $11_1$-$11_n$, one or more of the decoder stages $14_1$-$14_n$ will have the capability of de-compressing video in one of the MPEG 2, DV25, and DV50 SD formats or in one of the MPEG 2, H.264-MPE4 AVC and DV 100 HD formats.

Upon receipt of an incoming one of the streams $11_1$-$11_n$ of a specific compression format, a decoder stage associated with that format will decode the stream to yield successive uncompressed frames. Each uncompressed frame output by a decoder stage undergoes storage in a corresponding one of presentation buffer stages $18_1$-$18_n$, respectively, sized to receive the uncompressed frame. In practice, each of the presentation buffer stages $18_1$-$18_n$ holds a frame of a particular size which depends on the decompression format of its associated decoding stage. Typically, each of the presentation buffer stages $18_1$-$18_n$ will have one of the following standard sizes:

NTSC (720×480)
PAL (720×576)
1080i (1920×1080)
720p (1280×720)

Uncompressed SD frames will typically conform to either the NTSC or PAL format. Uncompressed HD frames, depending on their size, will undergo storage in a buffer stage capable of accommodating 1080i or 720p HD frames. If a decoded frame image does not conform to size of a presentation buffer stage, as can occur with some MPEG 2 video frames, the frame undergoes a clipping or cropping operation. For example, a 720×512 MPEG 2 frame will have 32 lines clipped before placed in presentation buffer stage.

A scaler 20 scales the frames read from each of the presentation buffer stages $18_1$-$18_n$ and also performs the required color space conversion associated with a video display renderer 22. For example, if the video display renderer 22 has an input frame size of 1920×1080 pixels associated with 1080i HD frames, the scaler 20 will scale all frames to that size. Any frames smaller than 1920×1080 pixels will undergo up-conversion by the scaler 20. Conversely, if the video display renderer 22 has an input frame size of 720×480 pixels, then the scaler 20 will down-convert larger size frames.

The decoder arrangement 10 of FIG. 1 improves efficiency by affording temporal parallelism. With software-based decoder arrangements, reading the compressed video stream can involve time spent with disk access. Additionally, writing frames of the uncompressed output stream typically will involve time spent performing bus transfers to display hardware. Waiting for to complete such input/output (I/O) tasks to occur does not constitute an efficient use of processing cycles. The decoder arrangement 10 of the present principles makes use of the presentation buffers $18_1$-$18_n$ to decouple the decoding stages $14_1$-$14_n$ from the scaler 20 that performs the scaling and color space conversion. After a frame (N) undergoes decoding and storage in a presentation buffer, a decoder stage can decode the next frame (N+1) as the scaler 20 formats the now uncompressed frame (N) for output. A lock semaphore protects each presentation buffer stage to prevent one thread from overrunning the other.

As discussed above, the decoder arrangement 10 makes use of a processor 12 for executing a software based program for decoding a plurality of streams $11_1$-$11_n$, typically, although not necessarily in serial fashion. Although FIG. 1 depicts the processor 12 as being dedicated to the decoding task, the processor could perform other operations in addition to decoding. Although not explicitly depicted in FIG. 1, the processor 12, when networked with other processors in a large system, could detect the number of other of processors available. If another processor besides processor 12 becomes available, then spatial parallelism becomes automatically enabled. Most video compression algorithms process an individual frame using a series of smaller sub-picture areas called macroblocks. The total number of macroblocks blocks can be divided among the available processors by creating multiple threads of execution. If the number of blocks for each processor remains less than the total number of blocks requiring decoding, then the time required to decode each frame is less. When using this method, each thread of execution is synchronized at the end of each frame to prevent image tearing.

The software-based decoding arrangement 10 affords several advantages are compared to stand-alone hardware decoders. For example, the decoder arrangement 10 can expand easily to support new compression standards as they become available since all that becomes necessary is a software update. In addition, individual $3^{rd}$-party CODEC components can be replaced if faster or better substitutes are found. Further, the decoder arrangement 10 can switch compression types on a video frame boundary, typically every 33 ms at NTSC rates and 40 ms at PAL rates to provide seamless decoding operations for all supported compression formats.

The foregoing describes a decoder arrangement for decoding video streams of different formats.

The invention claimed is:

1. A decoder for decoding at least first and second streams, comprising:
    at least first and second decoder stages, each simultaneously decoding a separate one of the at least first and second streams to yield at least first and second uncompressed streams, wherein each of the at least first and second streams are encoded first and second formats, which format is known before decoding commences, and wherein each of the at least first and second decoder stages have first and second decoding formats, each matching the first and second formats of the at least first and second streams;
    a routing stage for routing a separate one of the at least first and second streams to the at least first and second decoding stages, respectively;
    at least first and second buffer stages each storing a frame of a separate one of the first and second uncompressed streams, respectively; and
    a scaler for scaling the frames from the first and second buffer stages to a common size, wherein frames smaller than the common size are upconverted and frames larger than the common size are downconverted and further wherein a lock semaphore prevents each of the at least one or the first and second buffer stages from overrunning the other buffer stage.

2. The decoder of claim 1 wherein the first encoding format comprises one of the MPEG 2, DV25, and DV50 for standard definition (SD) video, and MPEG 2, H.264-MPE4 AVC and DV 100 for high definition video.

3. The decoder of claim 1 wherein the second encoding format comprises one of the MPEG 2, DV25, and DV50 for standard definition (SD) video, and MPEG 2, H.264-MPE4 AVC and DV 100 for high definition video.

4. The decoder of claim 1 wherein the at least first and second presentation buffer stages have different sizes.

5. The decoder of claim 4 wherein the first and second presentation buffer stages have a size of one of 720×480 pixels, 720×576 pixels, 1920×1080 pixels or 1280×720 pixels.

6. A decoder for decoding at least first and second streams, comprising:
    at least first and second decoder stages, each simultaneously decoding a separate one of the at least first and second streams to yield at least first and second uncompressed streams, wherein each of the at least first and second streams are encoded first and second formats, which format is known before decoding commences, and wherein each of the at least first and second decoder stages have first and second decoding formats, each matching the first and second formats of the at least first and second streams;
    a routing stage for routing a separate one of the at least first and second streams to the at least first and second decoding stages, respectively;
    at least first and second buffer stages each storing a frame of a separate one of the first and second uncompressed streams, respectively; and
    a scaler for scaling the frames from the first and second buffer stages to a common size, wherein a lock semaphore prevents each of the at least one of the first and second presentation buffer stages from overrunning the other buffer stage.

7. The decoder of claim 1 wherein each of the at least first and second presentation buffer stages decouples an associated one of the at least first and second decoder stages from the scaler to permit each decoder stage to decode independently to operation in temporal parallelism.

8. The decoder of claim 1 wherein the scaler performs color space conversion.

9. A method for decoding at least first and second streams, comprising:
    routing a separate one of the at least first and second streams for decoding;
    decoding simultaneously a separate one of the at least first and second streams to yield at least first and second uncompressed streams, respectively, wherein each of the at least first and second streams are encoded first and second formats known before decoding commences and the decoding step further comprises decoding the at least first and second streams using the first and second decoding formats;

storing a frame of a separate one of the at least first and second uncompressed streams; and scaling the stored frames of the first and second uncompressed streams to a common size, wherein frames smaller than the common size are upconverted and frames larger than the common size are downconverted and further wherein a lock semaphore prevents each of the at least one or the first and second buffer stages from overrunning the other buffer stage.

10. The method according to claim 9 wherein the first encoding format comprises one of the MPEG 2, DV25, and DV50 encoding formats for standard definition (SD) video, and MPEG 2, H.264-MPE4 AVC and DV 100 encoding formats for high definition video.

11. The method according arrangement of claim 1 wherein the second encoding format comprises one of the MPEG 2, DV25, and DV50 encoding formats for standard definition (SD) video, and MPEG 2, H.264-MPE4 AVC and DVI00 encoding formats for high definition video.

12. The method according to claim 9 further comprising the step of decoupling encoding of the at least first and second streams from scaling of the stored streams.

13. The method according to claim 9 further comprising the step of performing color conversion on the stored frames.

14. The method according to claim 9 further comprising the step of decoding multiple streams in spatial parallelism.

* * * * *